July 26, 1938.   I. STANDLEY   2,124,717
BASIN ATTACHMENT
Filed Nov. 16, 1937   2 Sheets-Sheet 1

Inventor

Ira Standley

By Clarence A. O'Brien
Hyman Berman
Attorneys

July 26, 1938.  I. STANDLEY  2,124,717
BASIN ATTACHMENT
Filed Nov. 16, 1937   2 Sheets-Sheet 2
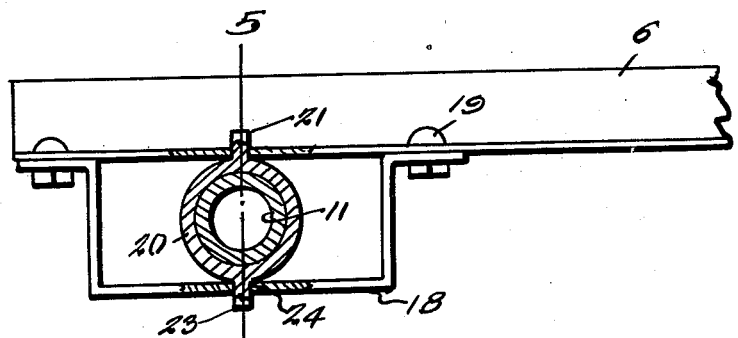
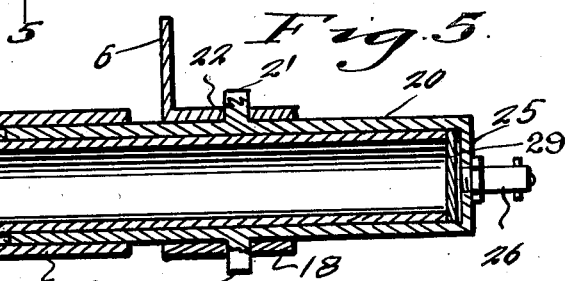
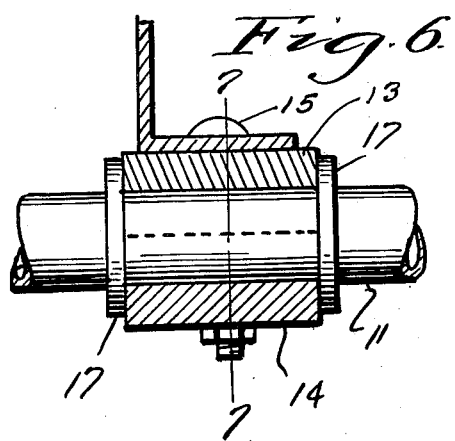
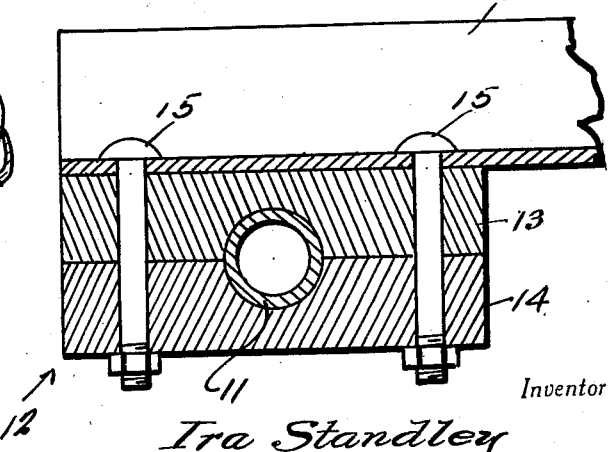
Inventor
Ira Standley
By Clarence A. O'Brien
Hyman Berman
Attorneys Patented July 26, 1938

2,124,717

UNITED STATES PATENT OFFICE 2,124,717

BASIN ATTACHMENT

Ira Standley, Garden City, Kans.

Application November 16, 1937, Serial No. 174,895

2 Claims. (Cl. 55—30)

This invention relates to what may be termed a "basin attachment", the object of the invention being the provision of a device adapted to be attached to the rear of a tractor, cultivator, or other draft vehicle to be drawn over the ground and equipped to form basins or shallow wells in the ground to catch and hold rain water or snow whereby the same will be prevented from running off the soil thus giving it sufficient opportunity to settle and effectually irrigate the land, as well as for corrugating and roughening the ground to prevent erosion by wind.

The invention together with its objects and advantages will be best understood from a study of the following description taken in connection with the accompanying drawings wherein:—

Figure 1 is a top plan view showing the attachment as applied to the rear of a disk cultivator.

Figures 2, 4 and 6 are detail sectional views taken substantially on the lines 2—2, 4—4 and 6—6, respectively of Figure 1.

Figure 5 is a detail sectional view taken substantially on the line 5—5 of Figure 4, and Figure 7 is a detail sectional view taken substantially on the line 7—7 of Figure 6.

Figure 1:
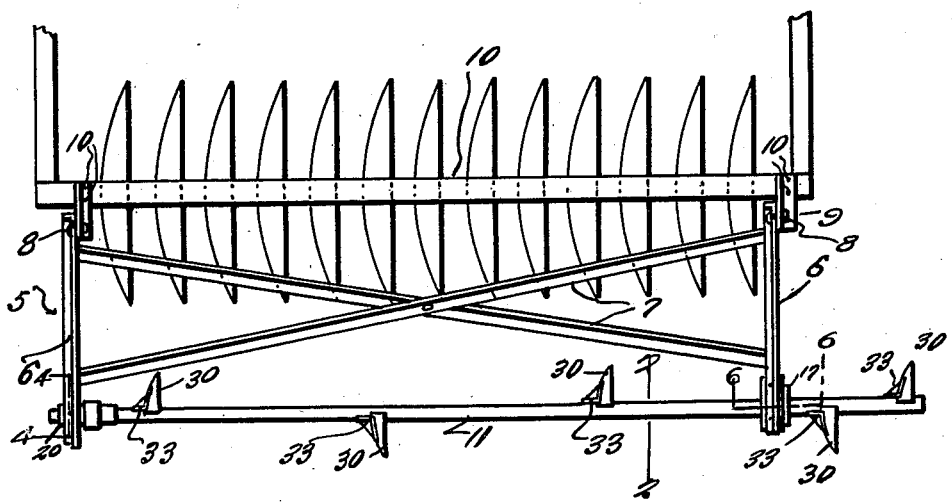

Referring to the drawings by reference numerals it will be seen that in the preferred embodiment thereof the attachment indicated generally by the reference numeral 5 comprises a frame consisting of a pair of angle iron end members 6—6 connected together and braced relative to one another through the medium of crossed diagonal brace rods 7.

At one end thereof the frame members 6 are adapted to be pivoted as at 8 to attaching brackets 9 that in turn are adapted to be fixedly mounted on the draft vehicle in conjunction with which the attachment is to be used.

In the present instance, and reference being had to Figure 1, it will be seen that I have illustrated the attachment 5 as being mounted on the rear end of a disk cultivator, only a portion of which is shown. Thus in applying the invention to the cultivator the brackets 9 are bolted or otherwise secured to the rear cross member 10 of the cultivator frame.

Rotatably supported between the frame members 6 at the rear ends of the latter is a hollow shaft 11.

For the shaft 11 there is mounted on the rear end of one of the frame members 6 a bearing 12 which, as clearly shown in Figures 6 and 7, comprises upper and lower bearing blocks 13, 14 bolted or otherwise secured to the aforementioned frame member 6 as at 15.

The end portion of the shaft 11 journaled in the bearing 12 is provided with spaced stop collars 17 as shown in Figure 7 to prevent longitudinal displacement of the shaft 11.

For supporting the opposite end of the shaft 11 the other frame member 6 at its rear end is provided with a substantially U-shaped bearing bracket 18 which as shown in Figure 4 is bolted or otherwise secured as at 19 to the said frame member 6.

Supported by the bracket 18 is an elongated tubular boxing 20 which intermediate its ends is provided with a lug 21 that is received in an opening 22 provided therefor in the horizontal flange of the frame member 6, and a lug 23 which is engaged in an opening 24 provided therefor in the bracket 18.

As shown in Figure 5 one end of the shaft 11 has a rotating fit within the boxing 20, and at one end thereof the boxing 20 is closed as at 25 and tapped into the wall 25 of the boxing is a zerk or other suitable lubricating fitting 26.

For the opposite or open end of the boxing 20 there is provided a dust cap 27 which is sleeved on the shaft 11 and is welded or otherwise secured thereto. The cap 27 snugly fits on the open end of the boxing 20 as shown.

Also, and if desired, the end of the shaft 11 fitting within the boxing 20 may have welded or otherwise secured thereto a closure disk 29 which would prevent any dirt which might accumulate in the shaft working into the boxing 20.

Arranged on the shaft 11, and in staggered relation relative to one another, is a series of earth working tools or digging blades 30.

Figure 2:
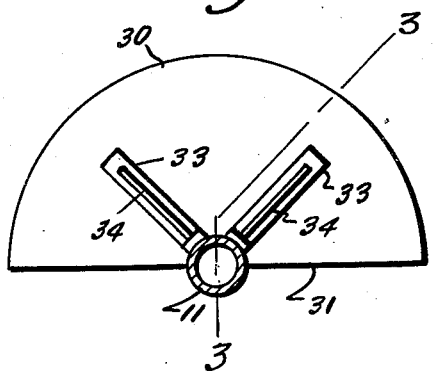
Figure 3:
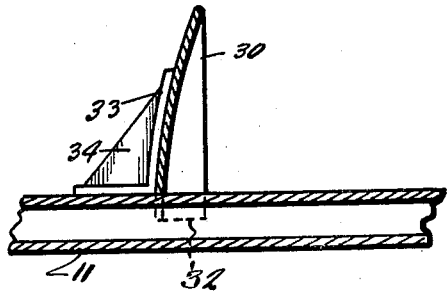
Figure 3 is a fragmentary detail sectional view taken substantially on the line 3—3 of Figure 2.

Each digging blade 30, as will be clear from a study of Figures 2 and 3, is in the form of one-half of a concavo-convex disk and at its straight edge 31 is suitably notched as at 32 to conformably engage the shaft 11.

Welded to the convex side of each member 30 is a pair of angular attaching brackets 33 which in turn are welded or otherwise positively secured to the shaft 11. The arms of the respective brackets 33 are braced relative to one another through the medium of webbing 34.

From the foregoing it will be apparent that in operation, when the draft vehicle to which the attachment 5 is mounted, is drawn over the ground the blades 30 will engage the ground in a manner to cause the shaft 11 to rotate, and said disks will serve to corrugate or roughen the ground for preventing erosion of soil by wind, and at the same time, due to the shape thereof, said blades 30 will scoop, at intervals, portions of the earth, tossing it to one side, thereby forming rows of suitably spaced wells or basins for catching rain water or snow. In this connection it will be noted that the wells or basins will be formed in spaced rows with the wells or basins in one row staggered in relation to the wells or basins in the next adjacent row.

These wells or basins will serve to retain the rain water or snow to the end that the same will be prevented from running off the soil and will thus have sufficient opportunity to settle and effectually irrigate the land.

It is thought that a clear understanding of the construction, utility and advantages of an invention of this character will be had without a more detailed description.

Having thus described the invention what is claimed as new is:—

1. An attachment for land vehicles comprising spaced parallel members, means for pivotally mounting said members on a vehicle for movement upwardly and downwardly with respect to the ground, a journal secured on one of said members, a shaft supported adjacent one end thereof by said journal, collars secured on said shaft and engaging opposite ends of the journal to prevent endwise movement of the shaft in said journal, a substantially U-shaped bracket secured on the other member and having an opening, said last-named member having an opening arranged opposite the opening in the bracket, a bearing sleeve receiving the shaft and arranged between the bracket and the last-named member and having a closed end overlying one end of the shaft and provided with a lubricating fitting, oppositely extending lugs formed on the sleeve and received by the openings, a cap secured on the shaft and snugly fitting over one end of the sleeve to retain lubricant in the latter, and ground engaging elements secured on the shaft.

2. An attachment for land vehicles comprising a shaft arranged transversely of a vehicle, means for mounting said shaft for rotation on the vehicle and for upward and downward movement with respect to the ground, spaced ground engaging elements secured on the shaft and each including one-half of a concavo-convex disk notched to receive the shaft, and a pair of angular attaching brackets arranged in converging relation to each other and secured on the shaft and on the convex side of the disk.

IRA STANDLEY.